United States Patent

[11] 3,580,275

[72] Inventors John R. Hanson;
Karl B. Pierson, Warren, Pa.
[21] Appl. No. 801,321
[22] Filed Feb. 24, 1969
[45] Patented May 25, 1971
[73] Assignee Tiona-Betts, Inc.
Warren, Pa.

[54] VALVE
1 Claim, 3 Drawing Figs.
[52] U.S. Cl. .................................................. 137/516.29,
137/540
[51] Int. Cl. ........................................................ F16k 15/02
[50] Field of Search............................................ 137/516.29,
516.27, 516.25, 538, 540, 543.21; 251/332

[56] References Cited
UNITED STATES PATENTS

| | | | |
|---|---|---|---|
| 1,229,885 | 6/1917 | Chadwick................. | 137/540X |
| 1,363,623 | 12/1920 | Smith........................ | 137/538X |
| 1,443,675 | 1/1923 | Bowler...................... | 137/540 |
| 2,697,915 | 12/1954 | Chisholm................. | 137/543.21X |
| 2,888,947 | 6/1959 | Montgomery et al... | 137/516.29X |
| 2,912,001 | 11/1959 | Green....................... | 251/332X |
| 3,255,774 | 6/1966 | Gallagher et al........ | 137/540X |

FOREIGN PATENTS

| | | | |
|---|---|---|---|
| 938,984 | 10/1963 | Great Britain............. | 137/540 |
| 1,084,897 | 9/1967 | Great Britain............. | 137/516.29 |

*Primary Examiner*—William F. O'Dea
*Assistant Examiner*—David J. Zobkiw
*Attorney*—Baldwin, Egan, Walling & Fetzer ABSTRACT: A combination pressure relief and check valve including an elongated valve body having a longitudinal bore therethrough with a tapered restricted bore portion at one end thereof forming a tapered valve seat. Reciprocably disposed in the bore is a valve disc having a tapered end portion which contacts the tapered valve seat to form a fluid-sealing engagement therewith. The disc tapered portion may have an annular O-ring disposed circumferentially thereon to provide a positive fluid seal with the valve seat. A coiled spring is longitudinally disposed in the bore and is compressed between the disc and a spring retainer locked in the opposite end of the bore to bias the disc against the seat in a normally closed position. An annular bore shoulder is formed at the juncture of the bore and the restricted bore portion, and the disc is formed with a coacting disc shoulder to seat against such bore shoulder to restrict travel of the disc into the tapered seat. The bore wall has elongated longitudinal ridges formed therein to guide the disc in the bore and to permit escape of pressurized fluid past the valve seat and through the spaces between the ridges to the atmosphere.

Patented May 25, 1971

3,580,275

INVENTORS.
JOHN R. HANSON
KARL B. PIERSON
BY
Baldwin, Egan, Walling & Fetzer
ATTORNEYS 3,580,275

VALVE

This invention relates to valves and more particularly to a combination pressure relief and check valve to allow flow of pressurized fluids in one direction and to check the flow in the other direction.

There has long been a need for a simple, inexpensive pressure relief and check valve for fluid pressure systems. Prior valves have numerous shortcomings such as expensive, complicated structure that are difficult to disassemble for cleaning and repair. Additionally, such prior valves require constant adjustment and do not effect pressure sensitive seating.

Therefore, it is an object of the invention to provide a simple, inexpensive pressure relief and check valve that allows flow of pressurized fluid in one direction above a predetermined pressure and checks flow in the other direction.

A further object of the invention is to provide a valve of the above type that effects pressure sensitive seating without adjustments.

A further object of the invention is to provide a valve of the above type that both seals and opens at low pressures.

A further object of the invention is to provide a valve of the above type that functions efficiently and without damage with low pressure in one direction and with high pressure or a wide range of pressures in the other direction.

A further object of the invention is to provide a valve of the above type that is simple in construction, inexpensive to manufacture, and highly effective in operation.

Briefly, the foregoing objects are accomplished by the provision of a combination pressure relief and check valve including a valve body preferably in the form of a threaded plug. The body has a longitudinal bore therethrough with a tapered restricted bore portion at one end thereof forming a tapered valve seat. A valve disc is reciprocably disposed in the bore and has an inwardly tapered end portion which contacts the tapered valve seat to form a fluid-sealing engagement therewith. The disc tapered portion has an annular O-ring disposed circumferentially thereon to provide a positive fluid seal with the valve seat. A suitable bias means in the form of a coiled spring is longitudinally disposed in the bore and is compressed between the disc and a spring retainer, which is locked in the opposite end of the bore, to bias the disc against the seat in a normally closed position. An annular bore shoulder is formed in the bore at the juncture of such bore and its restricted bore portion, and the disc is formed with a coacting annular disc shoulder to seat against such bore shoulder to restrict travel of the disc into the tapered seat. The bore wall has at least three elongated ridges formed therein to guide the disc when it reciprocates in the bore, and to permit escape of pressurized fluid past the valve seat and through the spaces between the ridges to the atmosphere.

Thus, there is provided a very simple and highly effective combination pressure relief and check valve of few inexpensive parts that allows flow of pressurized fluids in one direction above a predetermined pressure and checks flow in the other direction. The valve seals and opens at low pressure, is highly pressure sensitive, and does not require adjustment.

Other objects and advantages of the invention will be apparent from the following description taken in conjunction with the drawings wherein.

Figures 1, 2:
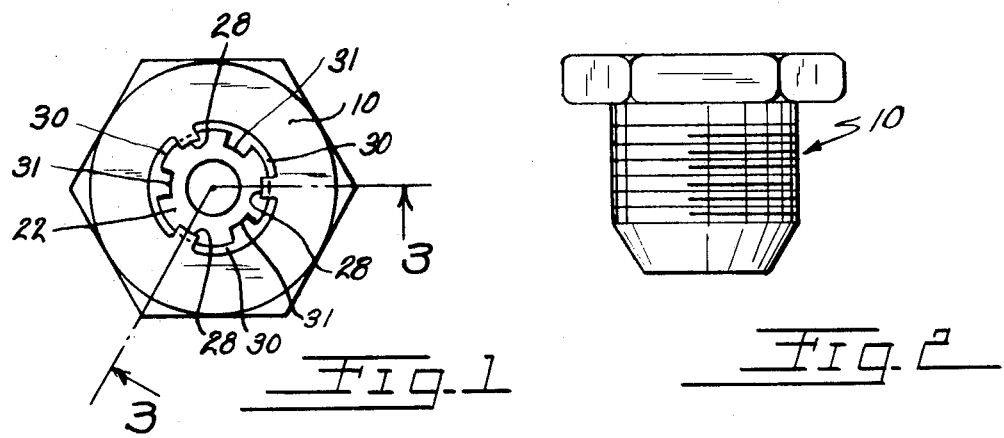
FIG. 1 is a top plan view of a valve constructed in accordance with the invention.
FIG. 2 is a side elevational view of the valve shown in FIG. 1.

Although the invention is shown and described herein with reference to a plug valve, it will be understood that it may be applied to any type of valve structure used to contain or control pressurized fluids.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

Referring to the drawings, there is shown a combination pressure relief and check valve of the invention including an elongated valve body 10 preferably in the form of a threaded plug as shown. The body 10 has a longitudinal bore 12 therethrough with a tapered restricted bore portion at the lower end thereof forming a tapered valve seat 14.

Reciprocably disposed in the bore 12 is a valve disc D, annular in cross section, having an inwardly tapered lower or outer end portion 16 which contacts the tapered valve seat 14 in a normally closed position to form a fluid-sealing engagement therewith. The disc tapered portion 16 may have an annular O-ring 18 disposed circumferentially thereon in the disc groove 17 to provide a positive fluid seal with the valve seat 14. The upper portion of the disc D is formed into a cup-shaped spring-receiving means 19. A disc shoulder 20 is provided at the juncture of the disc spring-receiving means 19 and the disc lower end portion 16.

A suitable valve bias means is provided in the form of a compressed coiled spring 21 which is longitudinally disposed in the bore 12 and is compressed between the disc D and the opposite end of the body in the form of a detachable spring retainer 22 which is locked in the opposite end of the bore, in a manner to be described, to bias the disc D against the seat 14 in a normally closed position. The lower end of the spring is disposed in the disc spring-receiving means 19.

An annular bore shoulder 24 is formed at the juncture of the bore 12 and the restricted bore portion or seat 14, and the disc shoulder 20 is formed to contact or seat against such bore shoulder 24 to restrict travel of the disc D into the tapered seat 14.

The wall of the bore 12 has three elongated longitudinal ridges 28 formed therein to guide the disc D in its reciprocation in the bore, and to permit escape of pressurized fluid past the valve seat 14 and through the spaces 30 between the ridges 28 to the atmosphere.

The spring retainer 22 has three peripheral notches 31 which match and coact with the ridges 28 to permit the retainer to be first inserted into the bore 12 against the bias of the compressed spring 21 and thence the retainer is circumferentially rotated so that the outer peripheral edge of the retainer is positioned in the ridge notches 34 to releasably lock the retainer in operative position.

In operation, the seat 14 is tapered to suit the pressure required. Also, the tension of the spring 21 may be changed to effect desired pressure. Thus, the assembled valve may function substantially indefinitely without adjustment to accommodate the pressure involved.

Figure 3:
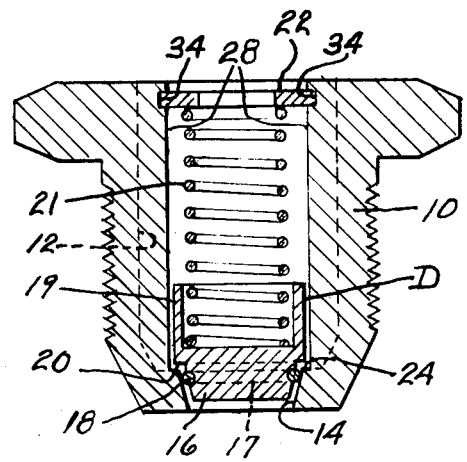
FIG. 3 is a side elevational sectional view taken along the line 3—3 of FIG. 1.

The valve is unique in that it both seals and opens at low pressure. For example, it seals bubble tight at 0 to 1 p.s.i. and opens at 1 to 1¼ p.s.i. The valve operates efficiently and without damage with low pressure in one direction (up in FIG. 3), and high pressure or any range of pressures in the other direction. The ridges 28 function as an accurate guide to provide highly sensitive seating. The parts required are few and may be made of a variety of materials. Such parts lend themselves easily to mass production at low cost. The valve may have connections at either or both ends and may operate with vacuum or pressure.

We claim:

1. A fluid pressure relief and check valve comprising, a valve body having an open-ended longitudinal bore therethrough with a restricted bore portion at one end thereof, said body forming a flanged threaded plug for insertion in an associated threaded aperture, said restricted bore portion being tapered inwardly toward the outer end thereof, a valve seat positioned on the tapered bore wall whereby the tapered bore wall of said tapered restricted bore portion forms such valve seat, a valve disc reciprocably disposed in said bore for coacting fluid-sealing engagement against said valve seat, bias means disposed in the bore to bias the disc against the seat in a normally closed position, the outer end portion of the disc being tapered inwardly toward the outer end of the disc to form a tapered disc wall which selectively contacts the tapered bore wall to form a coacting fluid seal thereat, said tapered disc wall containing a circumferential annular O-ring groove therein, an O-ring disposed in said groove to provide a positive fluid seal with the tapered bore wall, said bias means being a compressed coiled spring longitudinally disposed in the bore and compressed between the disc and the opposite end of the body, a spring retainer disposed in the bore at said opposite end in locked position therein to retain the spring in the bore and against the disc, said disc being an elongated object annular in cross section and having at its outer end said tapered disc wall and having at its other end a spring receiving means for holding one end of the spring against the disc, said spring receiving means being a cup-shaped hollow portion formed in the other end of the disc for receiving one end of the spring, an annular shoulder formed at the juncture of the bore and the restricted bore portion, said cup-shaped portion of the disc being formed with a shoulder to seat against said first-named shoulder to restrict travel of the disc into the tapered seat, and the wall of the bore having at least three elongated longitudinal ridges formed therein to guide the disc in the bore and to permit escape of the pressurized fluid past the seat and through the spaces between the ridges to the atmosphere, said shoulders being spaced from each other a preselected distance whereby a preselected increase in pressure on the valve disc will not further squeeze the O-ring.